United States Patent
Jeon et al.

(10) Patent No.: US 10,776,817 B2
(45) Date of Patent: Sep. 15, 2020

(54) SELECTING CONTENT FOR PRESENTATION TO AN ONLINE SYSTEM USER BASED ON CATEGORIES ASSOCIATED WITH CONTENT ITEMS

(71) Applicant: Facebook, Inc., Menlo Park, CA (US)

(72) Inventors: Sung-eok Jeon, Bellevue, WA (US); Aliasgar Mumtaz Husain, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 706 days.

(21) Appl. No.: 15/456,404

(22) Filed: Mar. 10, 2017

(65) Prior Publication Data
US 2018/0260840 A1 Sep. 13, 2018

(51) Int. Cl.
| | | |
|---|---|---|
| G06Q 30/00 | (2012.01) | |
| G06Q 30/02 | (2012.01) | |
| H04L 29/08 | (2006.01) | |
| G06N 20/00 | (2019.01) | |
| G06N 5/02 | (2006.01) | |

(52) U.S. Cl.
CPC ......... G06Q 30/0246 (2013.01); G06N 5/022 (2013.01); G06N 20/00 (2019.01); G06Q 30/0201 (2013.01); G06Q 30/0254 (2013.01); G06Q 30/0255 (2013.01); H04L 67/22 (2013.01); H04L 67/26 (2013.01); H04L 67/306 (2013.01)

(58) Field of Classification Search
CPC .......... G06Q 30/0246; G06Q 30/0201; G06N 5/022; G06N 20/00; H04L 67/26; H04L 67/306; H04L 67/22
See application file for complete search history.

(56) References Cited

U.S. PATENT DOCUMENTS 6,571,279 B1 * 5/2003 Herz ............... G06Q 30/02
709/217
8,332,258 B1 * 12/2012 Shaw ............... G06Q 30/0282
702/185
(Continued)

OTHER PUBLICATIONS

Cadez, Igor, et al. "Probabilistic Modeling of Transaction Data with Applications to Profiling, Visualization, and Prediction." ACM 2001. (Year: 2001).*
(Continued)

*Primary Examiner* — Luis A Brown
(74) *Attorney, Agent, or Firm* — Fenwick & West LLP

(57) ABSTRACT

An online system monitors actions performed by users of the online system in association with being presented with content items that are associated with various categories. A histogram may be generated to describe a pattern of an action previously performed by a user in response to being presented with content items associated with a category. The online system trains a model to predict a likelihood that the user will perform the action in response to being presented with a content item associated with the category based on the pattern of the action previously performed by the user and information describing one or more recent performances of the action by the user with a content item associated with the category. The predicted likelihood may be included in a content selection process that selects one or more content items for presentation to the user.

22 Claims, 4 Drawing Sheets

(56) References Cited

U.S. PATENT DOCUMENTS

| | | | | |
|---|---|---|---|---|
| 8,655,726 B1* | 2/2014 | Favero | | G06Q 30/0205 701/429 |
| 9,299,029 B1* | 3/2016 | Kim | | G05B 15/02 |
| 9,323,695 B2* | 4/2016 | Frachtenberg | | G06F 12/121 |
| 9,589,296 B1* | 3/2017 | Li | | G06Q 30/0641 |
| 10,176,365 B1* | 1/2019 | Ramanarayanan | | G06K 9/00335 |
| 10,229,213 B1* | 3/2019 | Duleba | | H04L 67/18 |
| 2006/0242011 A1* | 10/2006 | Bell | | G07G 1/0054 705/14.25 |
| 2011/0219013 A1* | 9/2011 | Maxwell, III | | G06F 16/00 707/750 |
| 2012/0078706 A1* | 3/2012 | Rajagopalan | | G06Q 30/0242 705/14.41 |
| 2013/0243388 A1* | 9/2013 | Du | | H04N 21/4882 386/224 |
| 2013/0275348 A1* | 10/2013 | Booth | | G06F 16/9535 706/12 |
| 2014/0096035 A1* | 4/2014 | Hall | | G06Q 30/0631 715/753 |
| 2014/0122166 A1* | 5/2014 | Argue | | G06Q 30/0201 705/7.29 |
| 2014/0122208 A1* | 5/2014 | Argue | | G06Q 30/0281 705/14.25 |
| 2014/0122209 A1* | 5/2014 | Argue | | G06Q 30/0609 705/14.25 |
| 2014/0324864 A1* | 10/2014 | Choe | | G06F 16/73 707/737 |
| 2014/0344343 A1* | 11/2014 | Zarkesh | | H04L 63/0227 709/203 |
| 2014/0358754 A1* | 12/2014 | Breeden | | G06Q 50/10 705/35 |
| 2015/0293989 A1* | 10/2015 | Bhargava | | G06F 7/02 707/737 |
| 2015/0326679 A1* | 11/2015 | Lin | | G06Q 50/06 709/204 |
| 2015/0339446 A1* | 11/2015 | Sperling | | G16H 50/70 705/3 |
| 2016/0055418 A1* | 2/2016 | Takamura | | G06N 20/00 706/11 |
| 2016/0117752 A1* | 4/2016 | Chacko | | G06Q 30/0631 705/26.7 |
| 2016/0162953 A1* | 6/2016 | Tang | | G06Q 30/0277 705/14.66 |
| 2017/0323340 A1* | 11/2017 | Jeon | | G06Q 30/0261 |
| 2017/0337250 A1* | 11/2017 | Li | | G06Q 50/01 |
| 2018/0182014 A1* | 6/2018 | Cheng | | H04L 67/18 |
| 2018/0218399 A1* | 8/2018 | Rajaram | | G06Q 30/0255 |

OTHER PUBLICATIONS

Cothey, Vivian. "A Longitudinal Study of World Wide Web Users' Information-Searching Behavior." Journal of the American Society for Information Science and Technology, vol. 53, pp. 67-78, 2002. (Year: 2002).*

* cited by examiner

SELECTING CONTENT FOR PRESENTATION TO AN ONLINE SYSTEM USER BASED ON CATEGORIES ASSOCIATED WITH CONTENT ITEMS

BACKGROUND

This disclosure relates generally to online systems, and more specifically to selecting content for presentation to a user of an online system based on categories associated with content items.

An online system allows its users to connect and communicate with other online system users. Users create profiles maintained by the online system that are tied to their identities and include information about the users, such as interests and demographic information. The users may be individuals or entities such as corporations or charities. Because of the popularity of online systems and the significant amount of user-specific information maintained by online systems, an online system provides an ideal forum for allowing users to share content by creating content items for presentation to additional online system users. For example, users may share photos or videos they have uploaded by creating content items that include the photos or videos. These content items are then presented to additional users to which the users are connected in the online system. By presenting content items to its users, an online system creates additional opportunities for the users to share their reactions to the content items. For example, users may express a preference for, comment on, or share content items with additional users of the online system.

An online system also provides advertisers with abundant opportunities to increase awareness about their products or services by presenting advertisements to online system users.

For example, advertisements presented to users allow an advertiser to gain public attention for products or services and to persuade online system users to take an action regarding the advertiser's products, services, opinions, or causes. Advertisements presented to online system users also may enable the users to easily make purchases or subscribe to services provided by advertisers. For example, an advertisement presented to users on the online system may be linked to a landing page, such that users who click on the advertisement are redirected to the landing page, where they may purchase products or services associated with the advertisement.

Conventionally, online systems generate revenue by displaying content items, such as advertisements, to their users. For example, an online system may charge advertisers for each presentation of an advertisement to an online system user (i.e., each "impression"), or for each interaction with an advertisement by an online system user. Furthermore, by presenting content items that users are likely to find interesting, online systems may increase the number of opportunities they have to generate revenue. For example, if a user scrolls through a newsfeed to view content items that capture their interest, advertisements that are interspersed in the newsfeed may be presented to the user. Online systems may also increase the number of opportunities they have to generate revenue by presenting content items that encourage user engagement with the online systems. For example, if a user finds a content item interesting, they are more likely to comment on, express a preference for, or share the content item, which in turn, creates more content items with which additional users may find interesting and/or interact. Therefore, online systems may maximize their revenue by presenting content items in which users are likely to have an interest and with which they are likely to interact.

However, users may be more likely to interact with content items during particular times than others. For example, a user who has a busy job may be more likely to comment on or share content items with other users to whom they are connected in the online system on weekends than on weekdays. Similarly, users who recently performed an action in association with being presented with a content item may be less likely to perform a similar action anytime soon. For example, if a user donates $500 to a charity after clicking through an advertisement for the charity, the user is unlikely to make another donation to the same or a similar charity a few days or even a few weeks later. In these and other circumstances, online systems may have difficultly identifying content items with which users are likely to interact. Thus, online systems may waste opportunities to present content items with which their users are likely to interact, which may be detrimental to the online systems and their users.

SUMMARY

An online system, such as an online advertising system, monitors actions performed by users of the online system in association with being presented with content items (such as newsfeed stories, recommendations, advertisements, or other content items) that are associated with various categories (e.g., entertainment, dining, travel, etc.). For example, upon receiving information describing a purchase made by a user in connection with clicking through a content item about apparel, the online system stores information describing the time of the purchase in association with information identifying an apparel category associated with the advertisement. The online system predicts likelihoods that the users will perform particular actions in response to being presented with content items associated with particular categories in the near future based on patterns of the actions previously performed by the users in response to being presented with content items associated with the same categories. For example, based on a user's pattern of previous clicks on content items associated with a particular category, upon receiving a request to present content to the user (e.g., in a newsfeed), the online system may predict a likelihood that the user will click on a content item associated with the category if the content item were to be included among the content presented to the user.

Patterns of actions previously performed by users in response to being presented with content items associated with various categories may be described by histograms generated by the online system. Each histogram generated by the online system may be specific to a user, an action that may be performed by the user in response to being presented with a content item (e.g., clicking on the content item, making a purchase associated with the content item, etc.), and a category that may be associated with the content item. The online system may categorize content items based on information describing their contents, metadata associated with the content items, or any other suitable information associated with the content items. The online system generates a histogram based on time intervals between consecutive occurrences of an action previously performed by a user in response to being presented with content items associated with the same category. For example, the online system plots time intervals between consecutive actions of the same type performed by a user with content items associated with a dining category (e.g., clicks on advertisements for restaurants) on a histogram. In this example, the height of each bar in the histogram is proportional to a frequency of an amount of time that has elapsed between consecutive actions and the width of each bar is equal to a time interval that includes an amount of time that has elapsed (e.g., between two and four days).

The online system trains a machine-learning model to predict a likelihood that a user will perform an action in response to being presented with a content item associated with a particular category based on patterns of the action previously performed by the user in connection with presentations of content items associated with the same category. For example, the online system may use an algorithm to generate a model to predict a likelihood that a user will share a content item associated with a crafts category based on each frequency corresponding to a time interval in a histogram that describes a pattern of sharing content items associated with the crafts category by the user.

In various embodiments, the online system may train the model to make predictions for the user based on patterns of the action previously performed by one or more additional users of the online system in response to being presented with content items associated with the same category. For example, the online system generates one or more histograms that describe patterns of purchases that were made by users living in the same household in association with being presented with advertisements associated with a pet supplies category (e.g., dog food and cat litter). In this example, since the users share a household with pets and may therefore share a pattern of purchasing pet supplies, the online system may train a model based on the patterns of pet supply purchases made by the users to predict a likelihood that one or more of the users will make a purchase when presented with an advertisement associated with the pet supplies category in the near future. As an additional example, if a user is a new user of the online system or does not frequently log in to the online system, the online system may have insufficient information to train a model to predict a likelihood that the user will click on a content item associated with a particular category if presented with the content item. In this example, the online system may train a model to make predictions for the user based on patterns of clicks by additional users on content items associated with the same category, in which the additional users have at least a threshold measure of similarity to the user (e.g., based on similar demographic information or interests shared by the user and the additional users).

Once trained, the online system may use the model to predict the likelihood that the user will perform the action when presented with a content item associated with the category in the near future. The online system may provide the times of one or more recent performances of the action by the user with a content item associated with the category as inputs to the model. For example, the online system retrieves information describing a user's most recent click on a content item associated with a baking category that occurred two days ago and provides this information as an input to a model. In this example, if the model was trained using a histogram for the user that indicates that about 73% of the user's consecutive clicks on content items associated with this category occurred two days apart, the online system may predict a 73% likelihood that the user will click on a content item associated with this category if presented with the content item that same day.

In some embodiments, the model may interpret recent performances of certain actions by the user in response to being presented with content items associated with certain categories as signals that indicate the user is unlikely to perform the action in association with being presented with content items of the same category in the near future. For example, if the user recently purchased an item that is likely to be expensive (e.g., a purchase made in connection with presentation of a content item associated with a vacation package or a car category) or an item that is likely to have a long lifetime (e.g., a purchase made in connection with presentation of a content item associated with a furniture or a computer category), the user is unlikely to make similar purchases in the near future. Hence, the online system predicts a low likelihood that the user will soon make another purchase in connection with being presented with advertisements associated with the same category. In such embodiments, the likelihood that is predicted by the online system may drop immediately after each performance of the action by the user and increase slowly from one performance of the action to the next.

The online system may use the predicted likelihood in a content selection process to select one or more content items for presentation to the user. The content selection process may rank content items based on a predicted affinity of the user for each content item such that a content item is ranked in proportion to a predicted likelihood that the user will perform an action associated with the content item. The content selection process may then select one or more of the highest ranked content items for presentation to the user. For example, if the online system predicts a high likelihood that the user will perform an action in response to being presented with a content item, the content item's rank is increased, thus increasing the likelihood that the content item is selected for presentation to the user; however, the content item's rank is decreased if the predicted likelihood is low to decrease the likelihood that the content item is selected for presentation to the user. As an additional example, if the predicted likelihood that the user will perform an action associated with a content item is at least a threshold likelihood, the online system may automatically assign the content item a particular rank (e.g., the highest rank) in the content selection process.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
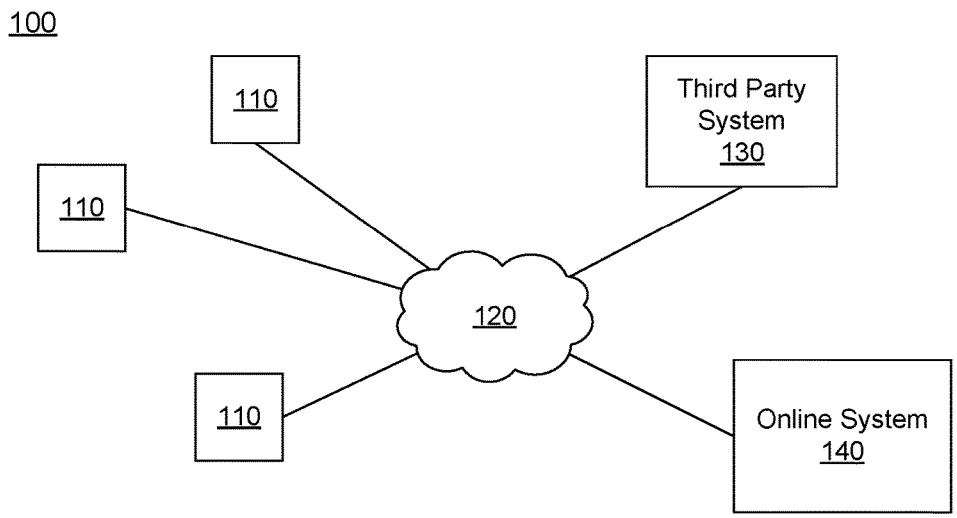
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third party systems 130, and the online system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 also may communicate information to the online system 140, such as advertisements, content, or information about an application provided by the third party system 130.

Figure 2:
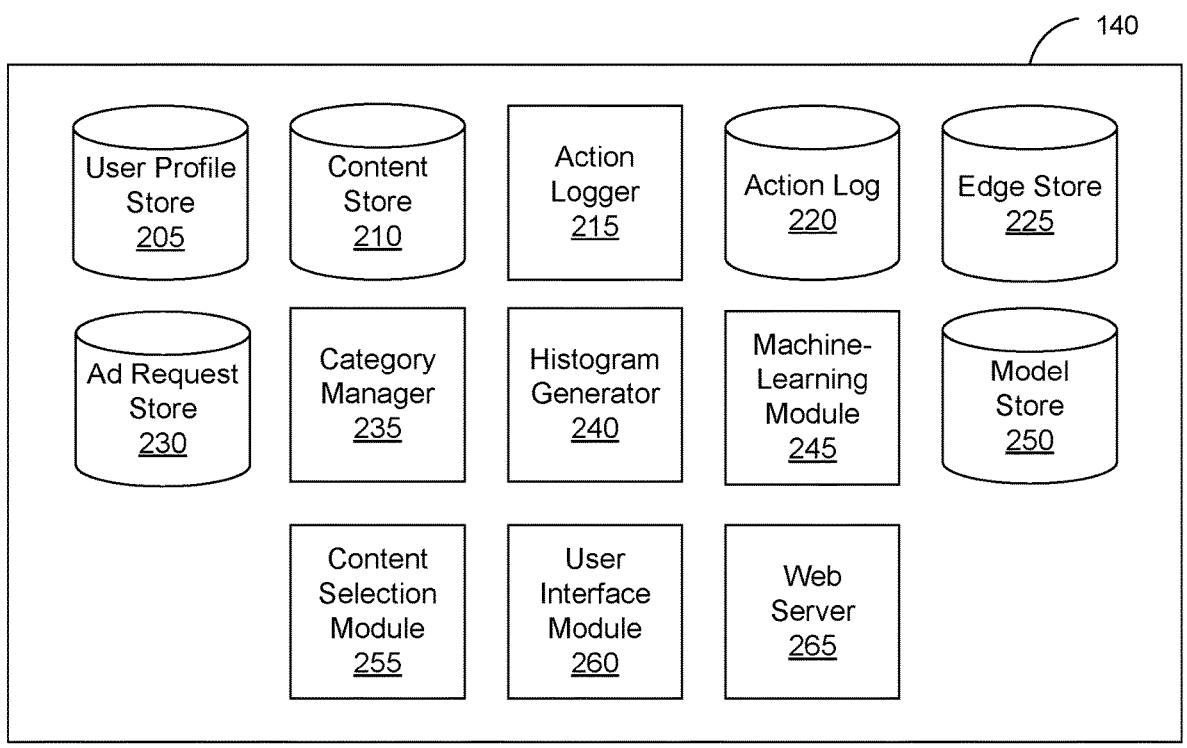
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an ad request store 230, a category manager 235, a histogram generator 240, a machine-learning module 245, a model store 250, a content selection module 255, a user interface module 260, and a web server 265. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

Various types of information may be included in communications about user actions received by the action logger 215. For example, information describing an action performed by a user may describe an identity of the user (e.g., a username or user ID) or the action that was performed by the user (e.g., clicking on the content item, making a purchase associated with the content item, sharing the content item, commenting on the content item, expressing a preference for the content item, etc.). Information describing an action performed by a user also may describe a category associated with the content item. For example, a content item describing a check-in by an online system user to a restaurant may be associated with a dining category. In some embodiments, multiple categories may be associated with a content item. For example, an advertisement for lamps may be associated with an advertisement category, a home decor category, and a lighting subcategory. Information describing an occurrence of an action performed by a user in association with being presented with a content item also may describe a time that the user performed the action. For example, the time at which a user clicked on a content item may be recorded as a timestamp describing a date and a time at which the user clicked on the content item and a time zone in which the user was located when they clicked on the content item.

The action logger 215 may store the information describing occurrences of an action performed by an online system user in the action log 220 and/or in the edge store 225, which are described below. For example, information describing actions performed by each online system user may be stored in a table in the action log 220, such that each occurrence of an action performed by a user may be stored in a row of the table. As an additional example, information describing each action performed by an online system user in association with presentation of a content item may be stored in association with an edge in the edge store 225, in which the edge describes a connection between the user and the content item.

The action log 220 may be used by the online system 140 to track user actions in the online system 140, as well as actions in the third party system 130 that communicate information to the online system 140. Users may interact with various objects in the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690,254 (U.S. Pat. No. 9,070,141, issued on Jun. 30, 2015), filed on Nov. 30, 2012, U.S. patent application Ser. No. 13/689,969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or in the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 140 if an advertisement in the ad request is presented to a user, if a user interacts with the advertisement in the ad request when presented to the user, or if any suitable condition is satisfied when the advertisement in the ad request is presented to a user. For example, the bid amount specifies a monetary amount that the online system 140 receives from the advertiser if an advertisement in an ad request is displayed. In some embodiments, the expected value to the online system 140 for presenting the advertisement may be determined by multiplying the bid amount by a probability of the advertisement being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users associated with user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria also may specify interactions between a user and objects performed external to the online system 140, such as on a third party system 130. For example, targeting criteria identifies users who have performed a particular action, such as having sent a message to another user, having used an application, having joined or left a group, having joined an event, having generated an event description, having purchased or reviewed a product or service using an online marketplace, having requested information from a third party system 130, having installed an application, or having performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The category manager 235 determines one or more categories associated with various content items maintained by the online system 140. Categories associated with content items may be of varying degrees of granularity. For example, a content item that includes a video tutorial for making a Christmas wreath may be associated with a crafts category, a crafts tutorial category, a seasonal crafts tutorial category, a Christmas crafts tutorial category, or a Christmas wreath tutorial category. In some embodiments, the category manager 235 may associate multiple categories with a content item. For example, an advertisement for high-heeled shoes may be associated with an advertisement category, a footwear category and a women's footwear subcategory.

The category manager 235 may categorize a content item based on information describing its contents, metadata associated with the content item, or any other suitable information associated with the content item. In some embodiments, the category manager 235 extracts information from a content item and uses the information to categorize the content item. In one embodiment, the category manager 235 extracts text from a content item and parses the text to identify keywords that may be used to categorize the content item. For example, if the keywords "APR" and "sedan" are included in text extracted from a content item, the category manager 235 uses the extracted keywords to categorize the content item. The category manager 235 may categorize a content item based on information extracted from the content item using semantic Web technologies, by accessing a database including various categorization rules and applying the rules, or using any other suitable categorization method. In the above example, the category manager 235 may query a database for one or more categories associated with the keywords "APR" and "sedan," which are associated with an automobile advertisement category based on one or more rules included in the database. In this example, the automobile advertisement category is returned in response to the query and the category manager 235 then associates the category with the content item.

The category manager 235 also may categorize a content item based on information describing a category explicitly provided by an online system user. For example, a user who created an advertisement for windshield wipers may specify an advertisement category associated with the advertisement and may further specify an automotive subcategory associated with the advertisement. A user may specify a category/subcategory associated with a content item by clicking on a radio button associated with a category/subcategory or by selecting a category/subcategory from a drop-down menu in a user interface presented by the online system 140 that allows users of the online system 140 to submit requests to create content items. The functionality of the category manager 235 is further described below in conjunction with FIG. 3.

The histogram generator 240 generates histograms describing patterns of occurrences of actions previously performed by online system users in association with presentations of content items associated with various categories. Each histogram may be specific to a user, a category that may be associated with a content item, and/or an action that may be performed by the user in response to being presented with a content item. Examples of actions that may be performed by a user in response to being presented with a content item include clicking on/accessing the content item, making a purchase associated with the content item, sharing the content item, commenting on the content item, expressing a preference for the content item, accepting an invitation to an event associated with the content item, subscribing to a service associated with the content item, etc.

The histogram generator 240 generates a histogram based on time intervals between consecutive occurrences of an action previously performed by a user in response to being presented with content items associated with the same category. A histogram associates a frequency of an amount of time that has elapsed between consecutive occurrences of an action performed by a user with each of multiple time intervals. For example, the histogram generator 240 plots time intervals between consecutive actions of the same type performed by a user with content items associated with a sushi category (e.g., clicks on advertisements for sushi restaurants) on a histogram. In this example, the histogram includes multiple bars, in which the height of each bar is proportional to a frequency of an amount of time that has elapsed between consecutive actions and the width of each bar is equal to a time interval that includes an amount of time that has elapsed between consecutive actions (e.g., between one and two days, between two and three days, etc.). The histogram generator 240 may retrieve information describing time intervals between consecutive occurrences of an action previously performed by a user in response to being presented with content items associated with the same category from the action log 220 or the edge store 225.

Histograms generated by the histogram generator 240 may be stored in the action log 220, in the edge store 225, and/or in the user profile store 205. For example, a histogram may be stored in the user profile store 205 in association with an identifier that describes an identity of the user (e.g., username or user ID). Alternatively, a histogram may be stored in the edge store 225 in association with an edge describing actions performed by the user with content items associated with a particular category.

A histogram may be stored in association with information identifying a user, a type of action previously performed by the user in response to being presented with various content items, and a category associated with the content items. For example, if a histogram generated by the histogram generator 240 describes clicks on content items associated with an online game that previously were performed by a user of the online system 140, the histogram may be stored in the action log 220 in association with a username associated with the user, information identifying the action performed by the user to be clicks, and an online gaming category.

In some embodiments, a histogram also may be stored in association with information describing one or more dates and/or times. For example, a histogram may be stored in association with a timestamp indicating a time that the histogram was generated. As an additional example, a histogram may be stored in association with timestamps indicating times of occurrences of an action previously performed by a user. The functionality of the histogram generator 240 is further described below in conjunction with FIGS. 3 and 4.

The machine-learning module 245 trains a machine-learning model to predict a likelihood that a user of the online system 140 will perform a particular action in response to being presented with a content item associated with a particular category. The machine-learning module 245 may train the model based at least in part on a pattern of the action previously performed by the user in connection with presentations of content items associated with the same category. For example, the machine-learning module 245 may use an algorithm to generate a model to predict a likelihood that a user will make a purchase in association with being presented with an advertisement associated with a jewelry category based on a pattern of previous purchases made by the user in association with being presented with advertisements associated with the jewelry category. In various embodiments, information describing the pattern of the action previously performed by the user is retrieved from a histogram generated by the histogram generator 240. In the above example, the machine-learning module 245 may train the model based on a frequency corresponding to each time interval in a histogram that describes an amount of time elapsed between consecutive purchases previously made by the user in association with being presented with advertisements associated with the jewelry category.

The machine-learning module 245 may train a model to predict a likelihood that a user will perform an action in response to being presented with content items associated with a particular category based on patterns of the action previously performed by one or more additional users in response to being presented with content items associated with the same category. For example, one or more histograms generated by the histogram generator 240 describe patterns of purchases that were made by users living in the same household in association with being presented with advertisements associated with a cleaning supplies category (e.g., laundry and dish detergent). Here, since the users share a household and therefore likely share a pattern of purchasing cleaning supplies, the machine-learning module 245 may train a model based on patterns of cleaning supply purchases made by the users to predict a likelihood that one or more of the users will make a purchase when presented with an advertisement associated with the cleaning supplies category in the near future. As an additional example, the machine-learning module 245 may have insufficient information to train a model to predict a likelihood that a user will share a content item associated with a particular category if presented with the content item if the user is a new user of the online system 140 or does not frequently log in to the online system 140. In this example, the machine-learning module 245 may train a model to make predictions for the user based on patterns of sharing content items associated with the same category by additional users having at least a threshold measure of similarity to the user (e.g., similar demographic information, occupations, or interests shared by the user and the additional users).

The model trained by the machine-learning module 245 may predict a likelihood that a user will perform an action when presented with a content item associated with a category in the near future based on inputs that describe times of one or more recent performances of the action by the user with one or more content items associated with the category. For example, information retrieved from the action log 220 describing a user's most recent comment on a content item associated with a pets category that occurred three days ago may be provided as an input to a model. In some embodiments, the likelihood that the user will perform the action in association with being presented with the content item associated with the category is proportional to a frequency associated with a time interval in a histogram that includes an amount of time elapsed since the time of the most recent occurrence of the action performed by the user. In the above example, if the model was trained using a histogram that indicates that about 57% of the user's consecutive comments on content items associated with the pets category occurred three days apart, the model may predict a 57% likelihood that the user will comment on a content item associated with this category if presented with the content item that same day.

In some embodiments, the machine-learning module 245 may train a model to interpret actions recently performed by a user in response to being presented with content items associated with certain categories as signals that indicate the user is unlikely to perform the action in association with being presented with content items of the same category in the near future. In such embodiments, the likelihood that the user will perform the action in association with being presented with a content item associated with the category is proportional to an amount of time elapsed since the time of the most recent occurrence of the action performed by the user. For example, if the user recently purchased an item that is likely to be expensive and/or to have a long lifetime (e.g., a purchase made in connection with presentation of content items associated with an engagement ring or a wireless service contract category), the user is unlikely to make similar purchases in the near future. In this example, the machine-learning module 245 trains the model to predict a low likelihood that the user will soon make another purchase in connection with being presented with advertisements associated with the same category (e.g., the likelihood that is predicted by the model may drop upon each performance of the action by the user and increase slowly from one performance of the action to the next).

In some embodiments, the machine-learning module 245 may retrain a model. The machine-learning module 245 may retrain a model periodically or as the online system 140 receives information describing occurrences of an action performed by a user with content items associated with a category. For example, the machine-learning module 245 may retrain a model to predict a likelihood that a user will click on content items associated with a restaurant category once every month or upon receiving information describing five clicks on content items associated with the restaurant category by the user, whichever occurs first. The functionality of the machine-learning module 245 is further described below in conjunction with FIGS. 3 and 4.

The model store 250 stores models trained by the machine-learning module 245. The models may be stored in the model store 250 in association with information used by the online system 140 to identify models that may be used to predict a likelihood that a particular user will perform a particular action with a content item associated with a particular category. For example, a model may be stored in association with information describing or identifying a user whose actions may be predicted using the model, (e.g., demographic information or a username associated with the user), information identifying a type of action that may be predicted by the model (e.g., commenting on the content item), and information identifying a category of content items for which the predictions may be made (e.g., movies). The models also may be stored in association with information describing a time when the models were trained or retrained. For example, each model may be stored in association with a time stamp describing when the machine-learning module 245 trained the model based on actions performed by an online system user with content items associated with a category. In this example, the time stamp stored in association with a model may be updated when the model is retrained using information describing more recent actions performed by the user with content items associated with the same category. The model store 250 is further described below in conjunction with FIG. 3.

The content selection module 255 selects one or more content items for communication to a client device 110 to be presented to a user. Content items eligible for presentation to the user are retrieved from the content store 210, from the ad request store 230, or from another source by the content selection module 255, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 255 includes content items eligible for presentation to the user in one or more selection processes, which identify a set of content items for presentation to the viewing user. For example, the content selection module 255 determines measures of relevance of various content items to the user based on characteristics associated with the user by the online system 140 and based on the user's affinity for different content items. Based on the measures of relevance, the content selection module 255 selects content items for presentation to the user. As an additional example, the content selection module 255 selects content items having the highest measures of relevance or having at least a threshold measure of relevance for presentation to the user. Alternatively, the content selection module 255 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 255 uses the bid amounts associated with ad requests when selecting content for presentation to the viewing user. In various embodiments, the content selection module 255 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. The content selection module 255 may rank ad requests based on their associated bid amounts and select ad requests having at least a threshold position in the ranking for presentation to the user. In some embodiments, the content selection module 255 ranks both content items not associated with bid amounts and ad requests in a unified ranking based on bid amounts associated with ad requests and measures of relevance associated with content items and ad requests. Based on the unified ranking, the content selection module 255 selects content for presentation to the user. Selecting ad requests and other content items through a unified ranking is further described in U.S. patent application Ser. No. 13/545, 266, filed on Jul. 10, 2012 (U.S. Publication No. US2014/ 0019261 A1, published on Jan. 16, 2014), which is hereby incorporated by reference in its entirety.

For example, the content selection module 255 receives a request to present a feed of content to a user of the online system 140. The feed may include one or more advertisements as well as content items, such as stories describing actions associated with other online system users connected to the user. The content selection module 255 accesses one or more of the user profile store 205, the content store 210, the action log 220, and the edge store 225 to retrieve information about the user. For example, stories or other data associated with users connected to the identified user are retrieved. Additionally, one or more advertisement requests ("ad requests") may be retrieved from the ad request store 230. The retrieved stories, ad requests, or other content items, are analyzed by the content selection module 255 to identify candidate content that is likely to be relevant to the identified user. For example, stories associated with users not connected to the identified user or stories associated with users for which the identified user has less than a threshold affinity are discarded as candidate content. Based on various criteria, the content selection module 255 selects one or more of the content items or ad requests identified as candidate content for presentation to the identified user. The selected content items or ad requests are included in a feed of content that is presented to the user. For example, the feed of content includes at least a threshold number of content items describing actions associated with users connected to the user via the online system 140.

In various embodiments, the content selection module 255 presents content to a user through a newsfeed including a plurality of content items selected for presentation to the user. One or more advertisements also may be included in the feed. The content selection module 255 also may determine the order in which selected content items or advertisements are presented via the feed. For example, the content selection module 255 orders content items or advertisements in the feed based on likelihoods of the user interacting with various content items or advertisements. The functionality of the content selection module 255 is further described below in conjunction with FIG. 3.

The user interface module 260 generates a user interface including content selected by the content selection module 255. In some embodiments, the user interface module generates a user interface that includes content selected by the content selection module 255 in only a portion of the user interface. For example, a user interface may include content items in a banner or along the right-hand side of the interface. The interface generated by the user interface module 260 also may include a separate display area in which the selected content may be presented (e.g., a pop-up window that overlays a portion of content presented by the online system 140).

In various embodiments, the user interface comprises a feed of content items (e.g., a newsfeed) that includes multiple content items selected for presentation to an online system user. For example, the user interface generator 260 generates a feed of multiple content items, in which a display area allows a user to view one or more content items at a time and a scrollbar allows the user to view additional content items included in the feed. The content items included in a feed of content items may include one or more advertisements. The order of content items in a feed of content items may be determined in part by a ranking of content items by the content selection module 255. For example, if the content selection module 255 selects two of the highest ranked content items for presentation to a user, the user interface module 260 generates a newsfeed with the highest ranked content item in the most prominent position of the newsfeed and the second highest ranked content item in the second most prominent position of the newsfeed.

The user interface generated by the user interface module 260 also may allow users of the online system 140 to communicate information to the online system 140. The user interface may include an interactive element (e.g., hyperlinked text or an image) that allows a viewing user to submit a request to the online system 140 or a third party system 130 to perform an action associated with a content item. For example, a user presented with a content item in the interface may share, indicate a preference for, or comment on a content item. As an additional example, a user that interacts with an advertisement presented in the interface may be redirected to a landing page on a third party website that allows the user to complete a purchase or subscribe to a service associated with the advertisement. The functionality of the user interface module 260 is further described below in conjunction with FIG. 3.

The web server 265 links the online system 140 via the network 120 to the one or more client devices 110, as well as to the third party system 130 and/or one or more third party systems. The web server 265 serves web pages, as well as other content, such as JAVA®, FLASH®, XML and so forth. The web server 265 may receive and route messages between the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

Figure 3:
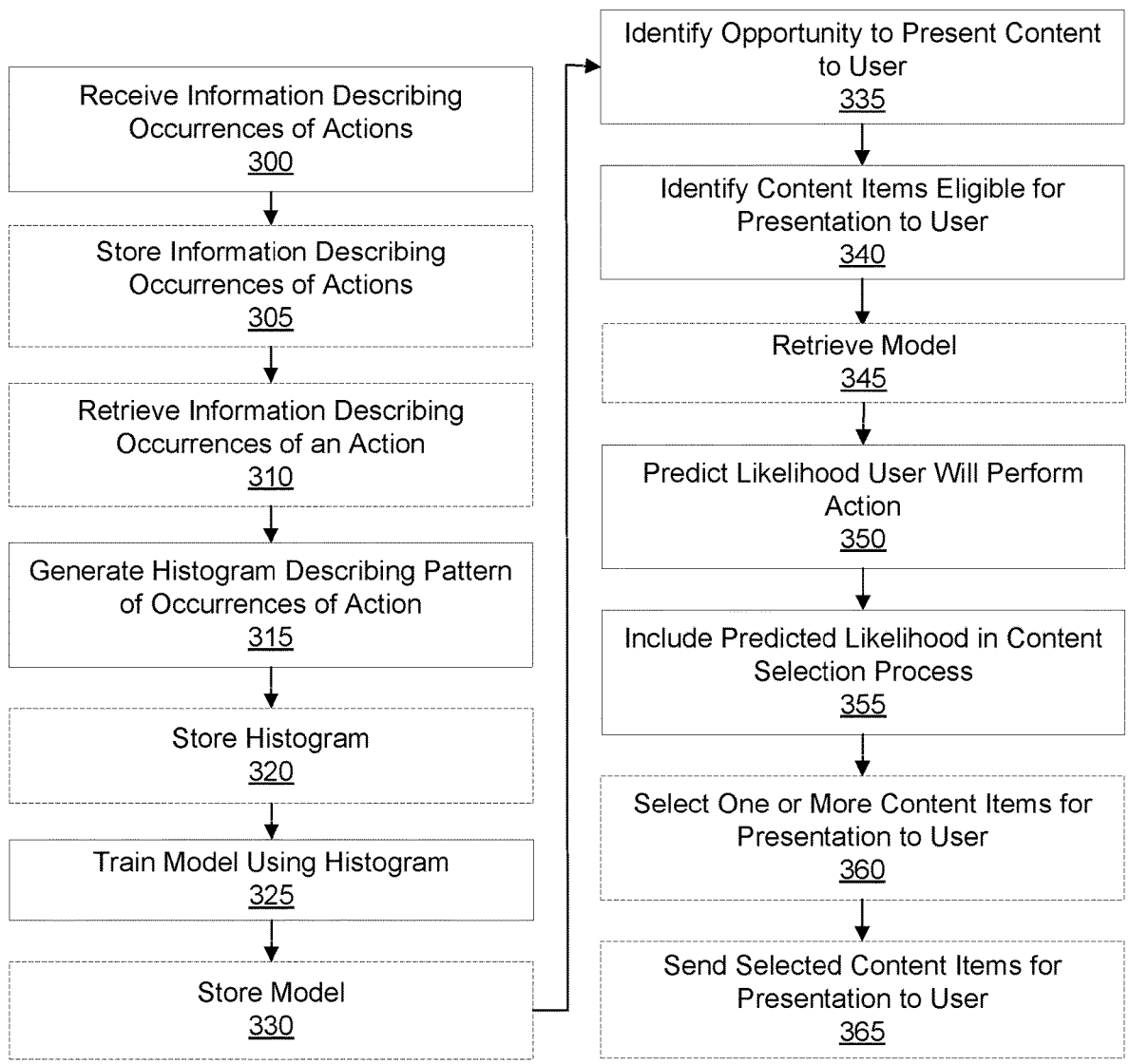
FIG. 3 is a flow chart of a method for selecting content for presentation to a user of an online system based on categories associated with content items, in accordance with an embodiment.

Selecting Content for Presentation to an Online System User Based on Categories Associated with Content Items FIG. 3 is a flow chart of a method for selecting content for presentation to a user of an online system based on categories associated with content items, according to one embodiment. In other embodiments, the method may include different and/or additional steps than those shown in FIG. 3. Additionally, steps of the method may be performed in a different order than the order described in conjunction with FIG. 3.

The online system 140 receives 300 (e.g., via the action logger 215) information describing occurrences of one or more actions performed by a user of the online system 140 in association with being presented with content items associated with various categories. The information describing each occurrence of an action performed by the user in association with being presented with a content item may include information identifying the user, information describing the action that was performed by the user, information describing a category associated with the content item, and information describing a time that the user performed the action. For example, when the online system 140 receives 300 information describing a purchase made by an online system user in association with presentation of a shoe advertisement by the online system 140, the information received 300 by the online system 140 may include a username of the user, an amount of the purchase and a description of the item purchased, a shoe advertisement category associated with the content item, and a date and time of day at which the user completed the purchase. Examples of types of actions that may be performed by the user in association with being presented with a content item include clicking on/accessing the content item, making a purchase associated with the content item, sharing the content item with additional users of the online system 140, commenting on the content item, expressing a preference for the content item, accepting an invitation to an event associated with the content item, subscribing to a service associated with the content item, etc.

The online system 140 may determine (e.g., using the category manager 235) one or more categories associated with each content item maintained by the online system 140. Categories associated with content items may have different degrees of granularity. For example, a content item that includes an image of an Easter-themed candy may be associated with a food category, a seasonal food category, a seasonal sweets category, or an Easter sweets category. In some embodiments, multiple categories may be associated with a content item. For example, a content item describing an online system user's trip to Australia may be associated with a personal post category, a vacation category, and an Australia subcategory. The online system 140 may determine a category associated with a content item based on various types of information, such as information describing its contents, metadata associated with the content item, etc. For example, the online system 140 may extract metadata associated with a photograph (e.g., geographic location information) included in a content item and use the metadata to categorize the content item. A content item may be categorized based on information extracted from the content item using semantic Web technologies, by applying various predetermined categorization rules, etc. The online system 140 also may categorize a content item based on information explicitly provided by an online system user describing a category associated with the content item. For example, a user who created a content item including a photograph of food taken at a restaurant may specify a check-in category associated with the content item and may further specify a restaurant subcategory associated with the content item (e.g., by clicking on a checkbox associated with a subcategory or selecting a subcategory from a drop-down menu in a user interface presented by the online system 140 that allows users of the online system 140 to submit requests to create content items).

In various embodiments, the online system 140 may store 305 (e.g., using the action logger 215) the information describing occurrences of the actions performed by the online system user in association with being presented with content items associated with various categories. The online system 140 may store 305 the information in the action log 220 and/or in the edge store 225. For example, information describing various actions performed by the online system user may be stored as entries in a table in the action log 220, such that each occurrence of an action performed by the user corresponds to a row of the table. As an additional example, information describing each action performed by the user in response to being presented with a content item may be stored in association with an edge in the edge store 225, in which the edge describes a connection between the user and the content item.

In some embodiments, the online system 140 retrieves 310 (e.g., using the histogram generator 240) information describing time intervals between consecutive occurrences of an action previously performed by the user in response to being presented with content items associated with a category. The online system 140 may retrieve 310 this information from the action log 220 or the edge store 225. For example, the online system 140 may access the action log 220 to identify information describing previous clicks on content items associated with an automobile advertisement category by the user and retrieve 310 the identified information. As an additional example, the online system 140 may access various edges stored in the edge store 225 to identify information describing previous purchases made by the user in association with presentations of content items associated with a furniture advertisement category and retrieve 310 the identified information.

The online system 140 generates 315 (e.g., using the histogram generator 240) a histogram describing patterns of occurrences of the action previously performed by the user in association with presentations of content items associated with the category to the user. The histogram may be specific to the user, the action previously performed by the user in association with presentation of content items associated with the category, and/or the category. The histogram is generated based on time intervals between consecutive occurrences of the action previously performed by the user in response to being presented with content items associated with the same category.

Figure 4:
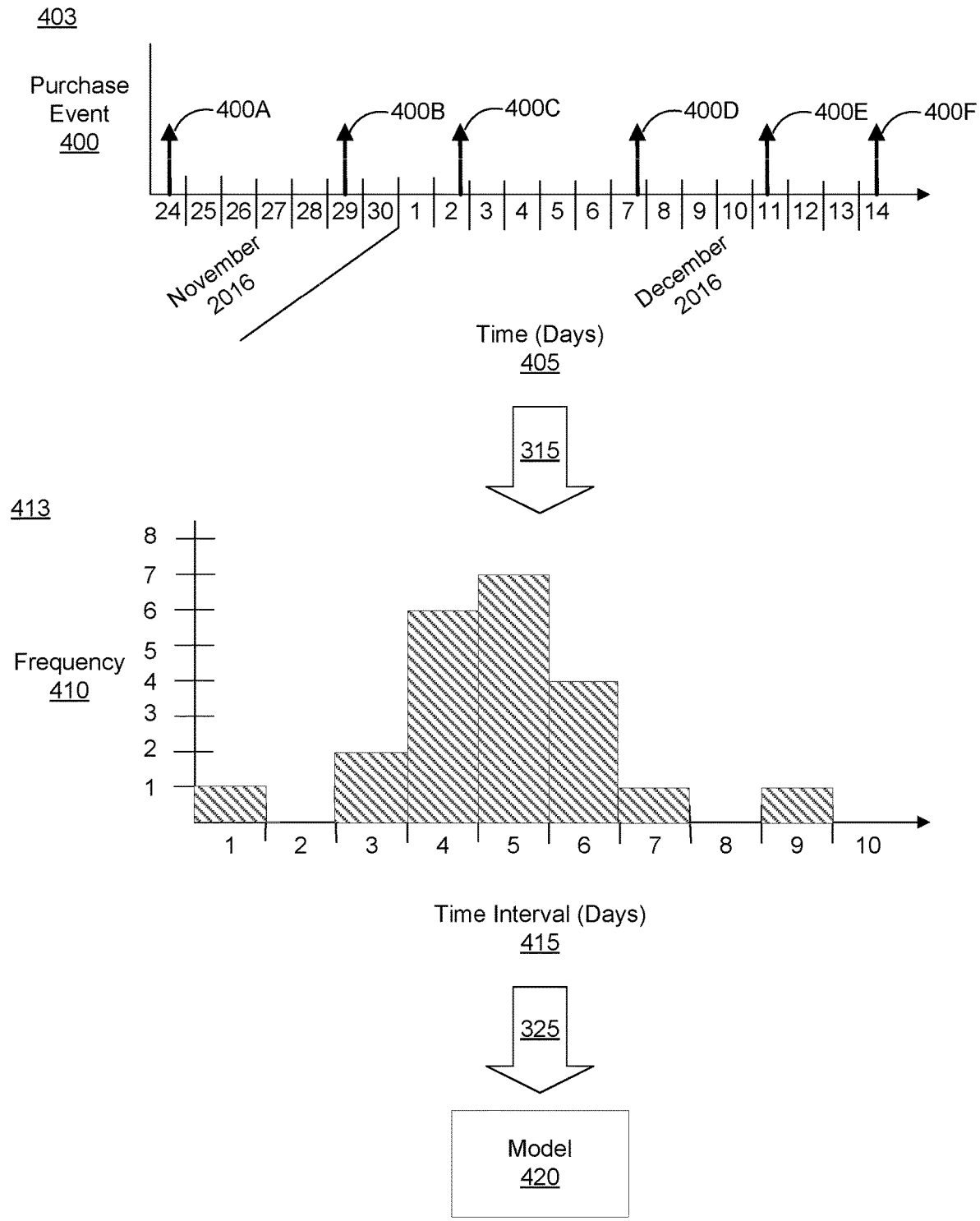
FIG. 4 is a conceptual diagram of a method for predicting a likelihood that a user of an online system will perform an interaction with content items associated with a particular category, in accordance with an embodiment.

As shown in the example of FIG. 4, the online system 140 creates a plot 403 of consecutive purchase events 400A-F performed by the user in association with presentations of content items associated with the same category. For example, purchase events 400A-F occurred on days 405 corresponding to Nov. $24^{th}$ 400A and $29^{th}$ 400B and on Dec. $2^{nd}$ 400C, $7^{th}$ 400D, $11^{th}$ 400E, and $14^{th}$ 400F of 2016. The online system 140 generates 315 a histogram 413 that includes multiple bars based on time intervals 415 between pairs of consecutive purchase events 400. Each bar of the histogram 413 has a height that indicates a frequency 410 of an amount of time that has elapsed between consecutive actions and a width that indicates a time interval 415 that includes an amount of time that has elapsed between purchase events 400 (e.g., between one and two days, between two and three days, etc.). For example, time intervals 415 of one day, two days, three days, four days, five days, six days, seven days, eight days, nine days, and 10 days between a pair of purchase events 400 have frequencies 410 of one, zero, two, six, seven, four, one, zero, one, and zero, respectively.

Referring back to FIG. 3, the online system 140 may store 320 the histogram 413 (e.g., in the action log 220, in the edge store 225, and/or in the user profile store 205). The histogram 413 may be stored 320 in association with various types of information including information identifying or describing the user, the type of action previously performed by the user in response to being presented with content items associated with the category, and the category associated with the content items. For example, if the histogram 413 describes a pattern of sharing content items associated with a weather application category by the user with additional users of the online system 140, the online system 140 may store 320 the histogram 413 in association with a username associated with the user, information identifying the action performed by the user to be sharing, and a weather application category. The histogram 413 also may be stored 320 in association with information describing one or more times associated with the histogram 413. For example, the histogram 413 may be stored 320 in association with a timestamp indicating the date and time that the histogram 413 was generated. As an additional example, the online system 140 may store 320 the histogram 413 in association with multiple timestamps indicating times of occurrences of the action previously performed by the user.

The online system 140 trains 325 (e.g., using the machine-learning module 245) a machine-learning model to predict a likelihood that the user will perform the action in response to being presented with a content item associated with the category. The online system 140 may train 325 the model based at least in part on a pattern of the action previously performed by the user in connection with presentations of content items associated with the same category. In various embodiments, information describing the pattern of the action previously performed by the user is retrieved from a histogram 413 stored in the action log 220, in the edge store 225, or in the user profile store 205. Referring again to FIG. 4, for example, using a histogram 413, the online system 140 may train 325 a model 420 to predict a likelihood that the user will make a purchase in association with being presented with an advertisement associated with a particular category based on a frequency 410 corresponding to each time interval 415 in a histogram 413 that describes a pattern of previous purchase events 400A-F completed by the user in association with being presented with advertisements associated with the same category.

Referring back to FIG. 3, in some embodiments, the online system 140 may train 325 the model 420 based on patterns of the action previously performed by one or more additional users of the online system 140 in response to being presented with content items associated with the same category. For example, one or more histograms 413 generated 315 by the online system 140 describe patterns of purchases that were made by users living in the same household in association with being presented with advertisements associated with babysitting services. Here, since the users share a household and therefore likely share a pattern of purchasing babysitting services, the online system 140 may train 325 a model 420 based on the patterns of purchases of babysitting services made by the users to predict a likelihood that one or more of the users will make a purchase when presented with an advertisement associated with the babysitting services category in the near future. The online system 140 may identify users sharing a household based on geographic location information received from client devices 110 associated with the users, explicit profile information provided by the users to the online system 140 (e.g., home addresses stored in association with user profiles retrieved from the user profile store 205), or based on any other suitable information.

As an additional example, the online system 140 may have insufficient information to train 325 a model 420 to predict a likelihood that the user will express a preference for a content item associated with a particular category if presented with the content item (e.g., if the user is a new user of the online system 140 or does not frequently log in to the online system 140). The online system 140 may train 325 a model 420 to make predictions for the user based on patterns of an action performed by additional users having at least a threshold measure of similarity to the user (e.g., users sharing similar demographic information, educational backgrounds, or hobbies with the user) in response to being presented with content items associated with the same category. The online system 140 may identify additional users of the online system 140 having at least a threshold measure of similarity to the user based on information retrieved from the user profile store 205 (e.g., profile information associated with the user that matches profile information associated with the additional users), based on information retrieved from the edge store 225 (e.g., a number of online system users to which the additional users and the user are mutually connected), or based on any other suitable information.

The online system 140 may train 325 the model 420 to predict the likelihood that the user will perform the action when presented with a content item associated with the category in the near future based on inputs that describe the times of one or more recent performances of the action by the user with a content item associated with the category. For example, information retrieved from the edge store 225 describing a user's most recent purchase made in association with presentation of a content item associated with a music category that occurred five days ago may be provided as an input to a model 420. The likelihood that the user will perform the action in association with being presented with the content item associated with the category that is predicted by the model 420 may be proportional to a frequency associated with a time interval in the histogram 413 that includes an amount of time elapsed since the time of the most recent occurrence of the action performed by the user. In the above example, if the model 420 was trained 325 using a histogram 413 for the user that indicates that about 26% of the user's consecutive purchases made in association with presentations of content items associated with the music category occurred five days apart, the model 420 may predict a 26% likelihood that the user will make a purchase if presented with a content item associated with the music category that same day.

In various embodiments, the online system 140 may train 325 the model 420 to interpret recent performances of certain actions by the user in response to being presented with content items associated with certain categories as signals that indicate the user is unlikely to perform the action in association with being presented with content items of the same category in the near future. In such embodiments, the likelihood that the user will perform the action in response to being presented with the content item associated with the category is proportional to an amount of time elapsed since the time of the most recent performance of the action by the user. For example, the online system 140 trains 325 the model 420 to predict a low likelihood that the user will soon purchase an item that is likely to be expensive and/or to have a long lifetime in the near future if the user recently purchased a similar item. In this example, the likelihood that is predicted by the model 420 may drop upon each performance of the action by the user and increase slowly from one performance of the action to the next.

In some embodiments, the online system 140 may retrain the model 420. The model 420 may be retrained periodically or as the online system 140 receives information describing occurrences of the action performed by the user with content items associated with the category. For example, the online system 140 may retrain a model 420 to predict a likelihood that a user will click on content items associated with an interior decorating category once every two weeks or upon every five clicks on content items associated with the interior decorating category by the user, whichever occurs first.

In some embodiments, the online system 140 may store 330 the machine-learning model 420 (e.g., in the model store 250). The online system 140 may store 330 the model 420 in association with information used by the online system 140 to identify the model 420. A model 420 may be identified based on information used to train 325 the model 420. For example, if a model 420 is trained 325 using occurrences of an action previously performed by a specific user in association with presentations of content items associated with a particular category, the model 420 may be stored 330 in association with information identifying the user, the type of action performed by the user, the times of the occurrences of the action, and the category associated with the content items. A model 420 also may be identified based on information that may be predicted by the model

420. For example, if a model 420 may be used to predict a likelihood that users of the online system 140 associated with specific demographic information or living in a particular household will perform a type of action in association with being presented with content items associated with a particular category, the model 420 is stored 330 in association with information identifying the demographic information/household, information identifying the type of action being predicted, and information identifying the category associated with the content items.

The model 420 also may be stored 330 in association with information describing a time when the model 420 was trained 325 or retrained. For example, a model 420 may be stored 330 in association with a time stamp describing when the machine-learning module 245 trained 325 the model 420. In this example, the time stamp stored in association with the model 420 may be updated when the model 420 is retrained using information describing more recent actions performed by the user with content items associated with the category.

The online system 140 identifies 335 an opportunity to present content to the user of the online system 140. In various embodiments, the online system 140 may identify 335 an opportunity to present content to the user upon receiving a request to present content (e.g., a feed of content items) to the user. For example, the online system 140 identifies 335 an opportunity to present a newsfeed to the user upon receiving a request from the user to log in to the online system 140 after verifying credentials provided by the user to access an account maintained by the online system 140 that is associated with the user.

The online system 140 may identify 340 (e.g., using the content selection module 255) one or more content items eligible for presentation to the user, in which each of the content items are associated with one or more categories. These content items may be identified 340 based on targeting criteria associated with each content item that specify one or more attributes of online system users eligible to be presented with the content item. For example, targeting criteria associated with a content item identify users associated with specific demographic information satisfying at least one of the targeting criteria. Attributes specified by targeting criteria are usually associated with online system users who are likely to have an interest in content items associated with the targeting criteria or who are likely to find such content items relevant. For example, content items associated with a video game may be associated with targeting criteria describing online system users who have expressed an interest in video games (e.g., users who have included playing video games as a hobby in their profile information, users who have downloaded game applications in the online system 140, users who work for companies that design video games, etc.).

The online system 140 may retrieve attributes associated with the user from the user profile store 205, the action store 220, and/or the edge store 225 and identify 340 content items that are eligible for presentation to the user by comparing targeting criteria associated with each content item with attributes associated with the user. For example, if a content item is associated with targeting criteria describing online system users who are male, who are at least 18 years old, and who have expressed an interest in tattoos, the online system 140 may retrieve information from the user profile store 205 to determine the age, gender, and interests associated with the user to determine if they satisfy the targeting criteria associated with the content item. In this example, if the information retrieved from the user profile store 205 describing the age and gender of the user satisfy the targeting criteria associated with the content item, the online system 140 also may retrieve information stored in the action store 220 or the edge store 225 to determine whether the user has expressed an interest in tattoos (e.g., whether the user has commented on content items associated with tattoos or has interacted with a page maintained by the online system 140 associated with tattoos). If so, the online system 140 may identify 340 the content item as being eligible for presentation to the user; if not, the online system 140 will not identify 340 the content item as being eligible for presentation to the user.

In embodiments in which the online system 140 stores 330 the model 420, the online system 140 may retrieve 345 the model 420 (e.g., from the model store 250). The online system 140 may identify the model 420 to retrieve 345 based on a measure of similarity between information stored 330 in association with the model 420 that is used by the online system 140 to identify the model 420 and information associated with the user, a content item eligible for presentation to the user, and a category associated with the content item. For example, the online system 140 may identify a model 420 stored 330 in association with information that identifies the user, a type of action that may be performed by the user with a content item eligible for presentation to the user, and a category associated with the content item. As an additional example, the online system 140 determines a measure of similarity between demographic information associated with the user and demographic information associated with users used to train each model 420, a measure of similarity between a category associated with a content item eligible to be presented to the user and a category associated with content items used to train each model 420, and a measure of similarity between an action, the likelihood of which is to be predicted by the model 420, and the actions used to train each model 420. In this example, the model 420 associated with the greatest measures of similarity is identified by the online system 140 and retrieved 345.

The online system 140 predicts 350 the likelihood that the user will perform the action in association with being presented with a content item associated with the category. The online system 140 may predict 350 the likelihood using the machine-learning model 420 based at least in part on an input that describes times of one or more of the most recent occurrences of the action performed by the user with a content item associated with the category. For example, information retrieved from the action store 220 or the edge store 225 describing a user's most recent clicks on a content item associated with a movies category that occurred three days ago and two hours ago is provided as an input to a model 420. The likelihood that the user will perform the action in association with being presented with the content item associated with the category that is predicted by the model 420 may be proportional to a frequency associated with a time interval in the histogram 413 that includes an amount of time elapsed since the time of the most recent occurrence of the action performed by the user. For example, if the model 420 was trained 325 using a histogram 413 for the user that indicates that about 43% of the user's consecutive clicks on content items associated with a hiking category occurred seven days apart, the model 420 may predict a 43% likelihood that the user will click on a content item associated with the hiking category if it has been seven days since the last time the user clicked on a content item associated with the category.

Figure 5:
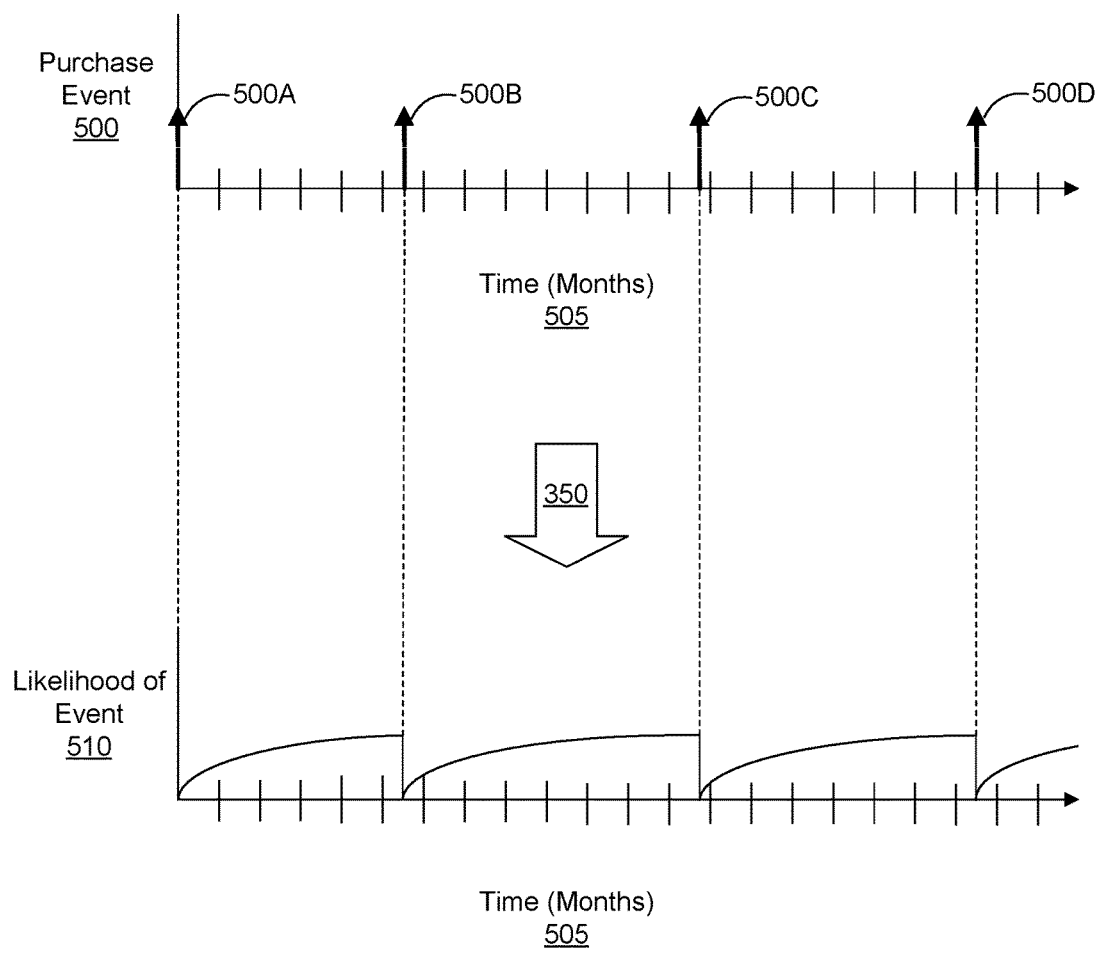
FIG. 5 is an additional conceptual diagram of a method for predicting a likelihood that a user of an online system will perform an interaction with content items associated with a particular category, in accordance with an embodiment.

Alternatively, the likelihood that the user will perform the action in association with being presented with the content item associated with the category that is predicted 350 by the model 420 may be proportional to an amount of time elapsed since the most recent performance of the action by the user. This may occur if the model 420 interprets the action as a signal that indicates the user is unlikely to perform the action in association with being presented with content items of the same category in the near future. As shown in the example of FIG. 5, the online system 140 plots purchase events 500A-D performed by the user in association with being presented with advertisements associated with a particular category over a time interval 505 of several months. The online system 140 predicts 350 a low likelihood 510 that the user will make a purchase 500A-D in response to being presented with advertisements associated with the category if the user recently made a similar purchase 500A-D in response to being presented with an advertisement associated with the same category. In this example, the likelihood 510 that is predicted 350 by the model 420 may drop upon receiving information indicating that the user made a purchase 500A-D, which slowly increases from one purchase event 500A-D performed by the user to the next.

Referring once more to FIG. 3, the online system 140 includes 355 the predicted 350 likelihood in a content selection process for selecting content for presentation to the user. The online system 140 may select 360 (e.g., using the content selection module 255) one or more content items to present to the user of the online system 140 using the content selection process. In some embodiments, the online system 140 selects 360 content items for presentation to the user based on the predicted 350 likelihood that the user will perform the action. For example, the online system 140 ranks content items based on a predicted 350 likelihood that an online system user will express a preference for each content item, such that content items associated with higher likelihoods are ranked higher than content items associated with lower likelihoods. In this example, the online system 140 selects 360 one or more content items based on the ranking (e.g., content items having at least a threshold ranking). As an additional example, if the predicted 350 likelihood that the user will perform an action associated with a content item is at least a threshold likelihood, the online system 140 may automatically assign a particular rank (e.g., the highest rank) to the content item in the content selection process.

In some embodiments, in addition to the predicted 350 likelihoods, the online system 140 may select 360 content items to present to a user based on additional factors. For example, when ranking content items that include advertisements, the online system 140 also may rank the content items based on a bid amount, a score, or other metric associated with each content item. In this example, the bid amount associated with an advertisement may be multiplied by a predicted 350 likelihood that a user will perform an action in association with being presented with the advertisement to obtain an expected value to the online system 140 for presenting the advertisement. The online system 140 may then select 360 content items to present to the user by ranking the advertisement among additional content items based on the expected value associated with the advertisement.

The online system 140 sends 365 the selected 360 content items for presentation to the user. In some embodiments, the online system 140 generates (e.g., using the user interface module 260) an interface that includes the selected 360 content items, which is then presented to the user. The content selected 360 by the online system 140 may be included in only a portion of the user interface. For example, a user interface may include content items in a banner or along the right-hand side of the interface. In some embodiments, the interface generated by the online system 140 also may include a separate display area in which the content selected 360 for presentation to the user may be presented (e.g., a pop-up window that overlays a portion of other content presented by the online system 140).

The user interface may comprise a feed of content items (e.g., a newsfeed) that includes multiple content items selected 360 for presentation to the user. For example, the online system 140 generates a feed of multiple content items, in which a display area allows the user to view one or more content items at a time and a scrollbar allows the user to view additional content items included in the feed. The content items included in the user interface may include one or more advertisements. The order in which content items are presented in a feed of content items may be determined in part by a ranking of content items eligible for presentation to the user. For example, in embodiments in which the online system 140 ranks content items based on the predicted likelihood that the user will perform an action in association with being presented with the content items and selects 360 three of the highest ranked content items for presentation to the user, the online system 140 generates a newsfeed with the highest ranked content item in the most prominent position of the newsfeed, the second highest ranked content item in the second most prominent position of the newsfeed, and the third highest ranked content item in the third most prominent position of the newsfeed.

The user interface generated by the online system 140 also may allow the user to communicate information to the online system 140. The user may communicate information to the online system 140 via an interactive element (e.g., hyperlinked text or an image) included in the user interface that allows the user to submit a request to the online system 140 or a third party system 130 to perform an action associated with a content item. For example, interactive elements included in the user interface may constitute social plug-ins that allow the user to share, indicate a preference for, or comment on a content item included in the user interface. As an additional example, the user interface may include an interactive element that redirects the user to a landing page on a third party website that allows the user to complete a purchase or subscribe to a service associated with an advertisement upon receiving an interaction with the interactive element.

The online system 140 may send 365 the selected 360 content items for display to the user by sending the interface to a client device 110 associated with the user. For example, the online system 140 sends 365 an interface including the selected 360 content items to a mobile device associated with the user, which is presented to the user in a display area of the mobile device.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system, information describing a plurality of occurrences of an action performed by a user of the online system in response to presentation of one or more content items to the user by the online system, the information comprising a time of each of the plurality of occurrences of the action and a category associated with the one or more content items presented to the user, the category determined from information extracted from the one or more content items by the online system;
   generating, by the online system, a histogram describing a pattern of the plurality of occurrences of the action performed by the user based on time intervals between consecutive occurrences of the action, the histogram associating a frequency of an amount of time that has elapsed between consecutive occurrences of the action performed by the user with each of a plurality of time intervals between consecutive occurrences of the action;
   identifying an opportunity to present content to the user;
   identifying a plurality of content items eligible for presentation to the user, the plurality of content items including the content item associated with the category;
   predicting, by the online system, the likelihood that the user will perform the action in association with being presented with the content item associated with the category, the likelihood predicted using a machine-learning model based at least in part on a time of a most recent occurrence of the plurality of occurrences of the action performed by the user, the histogram, and the category associated with the content item;
   including the likelihood that the user will perform the action in association with being presented with the content item associated with the category in a content selection process by the online system for selecting content for presentation to the user; and
   generating, by the online system, an interface including the content item associated with the category in response to the content selection process selecting the content item associated with the category, the interface including a feed of content items including the content item associated with the category.

2. The method of claim 1, further comprising:
   selecting one or more content items from the plurality of content items eligible for presentation to the user using the content selection process based at least in part on the likelihood that the user will perform the action in association with being presented with the content item associated with the category; and
   sending the selected one or more content items for presentation to the user.

3. The method of claim 2, wherein selecting the one or more content items from the plurality of content items eligible for presentation to the user using the content selection process by the online system based at least in part on the likelihood that the user will perform the action in association with being presented with the content item associated with the category comprises:
   ranking the plurality of content items eligible for presentation to the user based at least in part on the likelihood that the user will perform the action in association with being presented with the content item associated with the category; and
   selecting the one or more content items for presentation to the user based at least in part on the ranking.

4. The method of claim 3, wherein ranking the plurality of content items eligible for presentation to the user based at least in part on the likelihood that the user will perform the action in association with being presented with the content item associated with the category comprises:
   determining whether the likelihood that the user will perform the action in association with being presented with the content item associated with the category is at least a threshold likelihood; and
   responsive to determining the likelihood that the user will perform the action in association with being presented with the content item associated with the category is at least the threshold likelihood, assigning a highest rank to the content item.

5. The method of claim 1, further comprising:
   identifying an opportunity to present content to an additional user of the online system;
   identifying a plurality of content items eligible for presentation to the additional user, the plurality of content items including the content item associated with the category;

predicting a likelihood that the additional user will perform the action in association with being presented with the content item associated with the category, the likelihood predicted using the machine-learning model based at least in part on a time of a most recent occurrence of the action performed by the additional user; and including the likelihood that the additional user will perform the action in association with being presented with the content item associated with the category in a content selection process for selecting content for presentation to the additional user.

6. The method of claim 5, wherein the additional user of the online system has at least a threshold measure of similarity to the user.

7. The method of claim 5, wherein the additional user and the user share a household.

8. The method of claim 1, wherein the likelihood that the user will perform the action in association with being presented with the content item associated with the category is proportional to a frequency associated with a time interval of the plurality of time intervals by the histogram, the time interval including an amount of time elapsed since the time of the most recent occurrence of the action performed by the user.

9. The method of claim 1, wherein the likelihood that the user will perform the action in association with being presented with the content item associated with the category is proportional to an amount of time elapsed since the time of the most recent occurrence of the action performed by the user.

10. The method of claim 1, wherein the action performed by the user is of a type selected from a group consisting of: accessing a content item presented to the user by the online system, accepting an invitation in association with presentation of the content item to the user by the online system, sharing the content item with additional users of the online system, expressing a preference for the content item, making a purchase in association with presentation of the content item to the user by the online system, and subscribing to a service in association with presentation of the content item to the user by the online system.

11. A computer program product comprising a computer readable storage medium having instructions encoded therein that, when executed by a processor, cause the processor to:

receive, at an online system, information describing a plurality of occurrences of an action performed by a user of the online system in response to presentation of one or more content items to the user by the online system, the information comprising a time of each of the plurality of occurrences of the action and a category associated with the one or more content items presented to the user, the category determined from information extracted from the one or more content items by the online system;

generate, by the online system, a histogram describing a pattern of the plurality of occurrences of the action performed by the user based on time intervals between consecutive occurrences of the action, the histogram associating a frequency of an amount of time that has elapsed between consecutive occurrences of the action performed by the user with each of a plurality of time intervals between consecutive occurrences of the action;

identify an opportunity to present content to the user;

identify a plurality of content items eligible for presentation to the user, the plurality of content items including the content item associated with the category;

predict, by the online system, the likelihood that the user will perform the action in association with being presented with the content item associated with the category, the likelihood predicted using a machine-learning model based at least in part on a time of a most recent occurrence of the plurality of occurrences of the action performed by the user, the histogram, and the category associated with the content item;

include the likelihood that the user will perform the action in association with being presented with the content item associated with the category in a content selection process by the online system for selecting content for presentation to the user;

generate, by the online system, an interface including the content item associated with the category in response to the content selection process selecting the content item associated with the category, the interface including a feed of content items including the content item associated with the category.

12. The computer program product of claim 11, wherein the computer readable storage medium further has instructions encoded thereon that, when executed by the processor, cause the processor to:

select one or more content items from the plurality of content items eligible for presentation to the user using the content selection process based at least in part on the likelihood that the user will perform the action in association with being presented with the content item associated with the category; and send the selected one or more content items for presentation to the user.

13. The computer program product of claim 12, wherein select the one or more content items from the plurality of content items eligible for presentation to the user using the content selection process by the online system based at least in part on the likelihood that the user will perform the action in association with being presented with the content item associated with the category comprises:

rank the plurality of content items eligible for presentation to the user based at least in part on the likelihood that the user will perform the action in association with being presented with the content item associated with the category; and select the one or more content items for presentation to the user based at least in part on the ranking.

14. The computer program product of claim 13, wherein rank the plurality of content items eligible for presentation to the user based at least in part on the likelihood that the user will perform the action in association with being presented with the content item associated with the category comprises:

determine whether the likelihood that the user will perform the action in association with being presented with the content item associated with the category is at least a threshold likelihood; and responsive to determining the likelihood that the user will perform the action in association with being presented with the content item associated with the category is at least the threshold likelihood, assign a highest rank to the content item.

15. The computer program product of claim 11, wherein the computer readable storage medium further has instructions encoded thereon that, when executed by the processor, cause the processor to:

identify an opportunity to present content to an additional user of the online system;

identify a plurality of content items eligible for presentation to the additional user, the plurality of content items including the content item associated with the category;

predict a likelihood that the additional user will perform the action in association with being presented with the content item associated with the category, the likelihood predicted using the machine-learning model based at least in part on a time of a most recent occurrence of the action performed by the additional user; and include the likelihood that the additional user will perform the action in association with being presented with the content item associated with the category in a content selection process for selecting content for presentation to the additional user.

16. The computer program product of claim 15, wherein the additional user of the online system has at least a threshold measure of similarity to the user.

17. The computer program product of claim 15, wherein the additional user and the user share a household.

18. The computer program product of claim 11, wherein the likelihood that the user will perform the action in association with being presented with the content item associated with the category is proportional to a frequency associated with a time interval of the plurality of time intervals by the histogram, the time interval including an amount of time elapsed since the time of the most recent occurrence of the action performed by the user.

19. The computer program product of claim 11, wherein the likelihood that the user will perform the action in association with being presented with the content item associated with the category is proportional to an amount of time elapsed since the time of the most recent occurrence of the action performed by the user.

20. The computer program product of claim 11, wherein the action performed by the user is of a type selected from a group consisting of: accessing a content item presented to the user by the online system, accepting an invitation in association with presentation of the content item to the user by the online system, sharing the content item with additional users of the online system, expressing a preference for the content item, making a purchase in association with presentation of the content item to the user by the online system, and subscribing to a service in association with presentation of the content item to the user by the online system.

21. A method comprising:

receiving, at an online system, information describing a plurality of occurrences of an action performed by one or more users of the online system in response to presentation of one or more content items to the one or more users by the online system, the information comprising a time of each of the plurality of occurrences of the action and a category associated with the one or more content items presented to the user, the category determined from information extracted from the one or more content items by the online system;

identifying an opportunity to present content to a viewing user;

identifying a plurality of content items eligible for presentation to the viewing user, the plurality of content items including the content item associated with the category;

predicting, by the online system, the likelihood that the viewing user will perform the action in association with being presented with the content item associated with the category, the likelihood predicted using a machine-learning model based at least in part on an amount of time elapsed since a time of a most recent occurrence of the action performed by the viewing user;

including the likelihood that the viewing user will perform the action in association with being presented with the content item associated with the category in a content selection process by the online system for selecting content for presentation to the viewing user; and generating, by the online system, an interface including the content item associated with the category in response to the content selection process selecting the content item associated with the category, the interface including a feed of content items including the content item associated with the category.

22. The method of claim 21, wherein the one or more users of the online system includes the viewing user.

* * * * *